Patented July 6, 1943

2,323,315

UNITED STATES PATENT OFFICE 2,323,315

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application July 21, 1941, Serial No. 403,359

15 Claims. (Cl. 260—155)

This invention relates to new azo compounds and their application to the art of dyeing or coloring. Textile materials such as organic derivatives of cellulose, wool, silk, Nylon, and Vinyon and lacquers composed of cellulose esters, cellulose ethers and vinyl derivatives, for example, can be colored. Coloration can be effected by dyeing, printing, stencilling, or other suitable methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-proprionate, cellulose acetate-butyrate, and the cellulose ethers such as methyl cellulose, ethyl cellulose, or benzyl cellulose While our invention will be illustrated more particularly in connection with the coloration of cellulose acetate, a material to which the invention is especially adapted, it will be understood that it applies equally to the coloration of the other materials just mentioned.

It is an object of our invention to provide a new class of azo dyes. Another object of our invention is to provide colored textile materials which possess excellent fastness to light, excellent resistance to burnt gas fumes, good fastness to washing and which are easily dischargeable to a pure white. A further object is to provide a process for the coloration of textile materials such as organic derivative of cellulose, wool, silk, Nylon and Vinyon textile materials. Other objects appear herein.

The azo compounds of our invention by means of which the above objects are accomplished or made possible consist of the azo compounds having the formula:

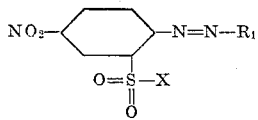

wherein X stands for a member selected from the group consisting of an alkyl group, an alkylcarboxyl group, and an alkylcarboxamide group, and $R_1$ stands for a member selected from the group consisting of a 1-alkyl-2-low carbon alkyl tetrahydroquinoline nucleus and a 1-alkyl-2-low carbon alkyl phenmorpholine nucleus, said tetrahydroquinoline and phenmorpholine nuclei being joined to the azo bond shown through the carbon atom in the 6-position.

While our invention relates broadly to the azo compounds having the above formula, it relates more particularly to the azo compounds having the formula:

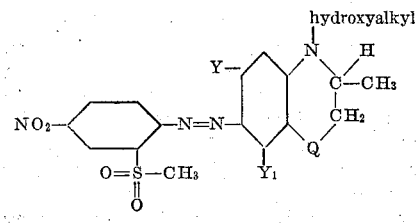

wherein Q stands for a member selected from the group consisting of O and $CH_2$ and Y and $Y_1$ each stand for a member selected from the group consisting of hydrogen, a low carbon alkyl hydrocarbon group, and a halogen atom.

The alkyl group attached to the nitrogen atom forming a part of the tetrahydroquinoline and phenmorpholine nucleus is ordinarily an alkyl group such as methyl, ethyl, propyl, butyl, β-hydroxyethyl, β-hydroxypropyl, β,γ-dihydroxypropyl, γ-hydroxypropyl, δ-hydroxybutyl, β-sulfoethyl, β-sulfatoethyl, β-methyl-β,γ-dihydroxypropyl and pentaerythrityl, for example. Similarly, by a low carbon alkyl group we refer more particularly to groups such as methyl, ethyl, propyl, butyl, and β-hydroxyethyl.

Compounds wherein the alkyl group in the 2-position of the phenmorpholine and tetrahydroquinoline nuclei is methyl have been found particularly advantageous. Likewise, compounds wherein the alkyl group attached to the nitrogen atom of the phenmorpholine and tetrahydroquinoline nuclei is a hydroxyalkyl group appear to be generally advantageous, and of these β,γ-dihydroxypropyl and β-methyl-β,γ-dihydroxypropyl appear to be most advantageous. Similarly, the presence of a methyl group in the 7-position of the phenmorpholine and tetrahydroquinoline nuclei appears to be beneficial.

Similarly, in the interest of clarity, it is here noted that the tetrahydroquinoline and phenmorpholine nuclei are numbered as indicated hereinafter.

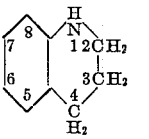

Tetrahydroquinoline

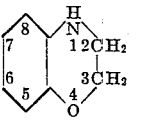

Phenmorpholine

The azo compounds of our invention constitute valuable dyes for the coloration of the materials hereinbefore named, especially for the coloration of cellulose acetate and Nylon. For the coloration of organic derivative of cellulose textile materials, nuclear non-sulfonated compounds should be employed, and it is to such compounds that our invention is more particularly directed. These compounds likewise can be used to color the other materials named herein. Nuclear sulfonated compounds of the invention, which can be prepared by sulfonation of the unsulfonated compounds, possess little or no utility for the coloration of organic derivative of cellulose textile materials but can be used to color wool and silk.

Generally speaking, the dye compounds of our invention possess exceptional light fastness properties, and as they yield valuable rubine and violet shades on cellulose acetate silk, one is able to dye this material light fast violet shades. So far as we are aware, previous attempts to secure such light fast violet shades on cellulose acetate have not been very successful. Our investigations lead us to believe that it is the presence of a single low carbon alkyl group, especially methyl, in the 2-position of the phenmorpholine or tetrahydroquinoline nucleus which effects such an improvement in the light fastness of the dyeings obtained. This discovery could not have been predicted.

The new azo compounds of our invention possess the further advantages of being easily dischargeable and of having superior resistance to burnt gas fumes. Other advantages include good affinity for cellulose acetate silk and the ability to dye this material rapidly at relatively low temperatures.

The azo compounds of our invention can be prepared by diazotizing compounds having the formula:

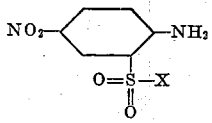

wherein X has the meaning previously assigned to it and coupling the diazonium compounds obtained with the tetrahydroquinoline and phenmorpholine compounds indicated hereinbefore.

The following examples illustrate the preparation of the azo compounds of our invention.

EXAMPLE 1

One gram mole of 2-amino-5-nitrophenylmethylsulfone is diazotized in an acetic acid solution of nitrosyl sulfuric acid in known manner, following which the diazonium solution obtained is poured into water and added to a cold aqueous hydrochloric acid solution of one gram mole of 1-$\beta,\gamma$-dihydroxypropyl-2,7-dimethyl tetrahydroquinoline. The coupling reaction which takes place is completed by adding sodium carbonate until the reaction mixture is neutral to Congo red paper. The dye compound formed is recovered by filtration, washed with water, and dried. Cellulose acetate silk, wool, silk, Nylon, and Vinyon are colored violet shades of excellent light fastness by the dye compound obtained.

An equivalent gram molecular weight of 1-$\beta,\gamma$-dihydroxypropyl-2-methylphenmorpholine, 1-$\beta,\gamma$-dihydroxypropyl-2,7 - dimethyl phenmorpholine, 1-$\beta,\gamma$-dihydroxypropyl-2,5-dimethylphenmorpholine, and 1-$\beta,\gamma$-dihydroxypropyl - 2 - methyl - 7 - chlorotetrahydroquinoline can be substituted for the coupling component of the above example to obtain dye compounds of our invention.

EXAMPLE 2

One gram mole of 2-amino-5-nitrophenylmethylsulfone is diazotized as described in Example 1, and the diazonium compound obtained is coupled with one gram mole of 1-$\beta,\gamma$-dihydroxypropyl-2-methyltetrahydroquinoline. Coupling and recovery of the dye compound formed can be carried out in accordance with the procedure described in Example 1. The dye compound obtained colors the materials named hereinbefore violet shades.

EXAMPLE 3

One gram mole of 2-amino-5-nitrophenylmethylsulfone is diazotized, and the diazonium compound obtained is coupled with one gram mole of 1-$\beta$-methyl-$\beta,\gamma$-dihydroxypropyl-2,7-dimethyltetrahydroquinoline. Coupling and recovery of the dye compound formed can be carried out in accordance with the procedure described in Example 1. The dye compound obtained yields violet shades of the materials named herein.

EXAMPLE 4

One gram mole of 2-amino-5-nitrophenylethylsulfone is diazotized, and the diazonium compound obtained is coupled with one gram mole of 1-$\beta$-hydroxyethyl-2,7-dimethyltetrahydroquinoline. Diazotization, coupling and recovery of the dye compound formed can be carried out in accordance with the procedure described in Example 1. The dye compound obtained colors the materials previously named violet.

EXAMPLE 5

One gram mole of 2-amino-5-nitrophenyl-$\beta$-methoxyethylsulfone is diazotized, and the diazonium compound obtained is coupled with one gram mole of 1-pentaerythrityl-2-methyltetrahydroquinoline. Diazotization, coupling and recovery of the dye compound formed can be carried out in accordance with the procedure described in Example 1. The dye compound obtained colors the textile materials named hereinbefore violet.

EXAMPLE 6

One gram mole of 2-amino-5-nitrophenyl-$\omega$-carboxymethylsulfone is diazotized, and the diazonium compound is coupled with one gram mole of 1-$\beta$-hydroxyethyl-2,5 - dimethylphenmorpholine. Diazotization, coupling and recovery of the dye compound formed can be carried out in accordance with the procedure described in Example 1. The dye compound obtained colors cellulose acetate silk bluish violet. If desired, the sodium, potassium, or triethanolamine salt, for example, of the dye compound can be prepared by methods known to those skilled in the art. We would here note that the carboxy group attached to the "methylsulfone" group may be replaced by its alkyl ester, such as the methyl or ethyl ester, or the carboxy group may be converted to its amide form or to a nitrile group.

EXAMPLE 7

One gram mole of 2-amino-5-nitrophenyl-β-hydroxy-β-ethoxyethylsulfone is diazotized, and the diazotized compound obtained is coupled with one gram mole of 1-β-methyl-β,γ-dihydroxypropyl-2,7-dimethylphenmorpholine. Diazotization, coupling and recovery of the dye compound stituted for the diazonium compound of the example to obtain a dye which yields colorations.

The following tabulation further illustrates the compounds included within the scope of our invention, together with the color they produce on cellulose acetate silk.

The compounds indicated below may be prepared by diazotizing the amines listed under the heading "Amine" and coupling the diazonium compounds obtained with the compounds specified in the column entitled "Coupling component."

The diazotization and coupling reactions may, for example, be carried out following the general procedure described in Examples 1 to 10 inclusive.

| Amine | Coupling component | Color |
|---|---|---|
| 2-amino-5-nitrophenylmethylsulfone | (1) 1-β-hydroxyethyl-2-methyl-7-chlortetrahydroquinoline | Bluish-rubine. |
| Do | (2) 1-β-hydroxypropyl-2-methyltetrahydroquinoline | Violet. |
| Do | (3) 1-γ-hydroxypropyl-2-methylphenmorpholine | Do. |
| Do | (4) 1-β,γ-dihydroxypropyl-2,7-dimethylphenmorpholine | Bluish-violet. |
| Do | (5) 1-β-methyl-β,γ-dihydroxypropyl-2,7-dimethyltetrahydroquinoline | Do. |
| Do | (6) 1-β,γ-dihydroxypropyl-2,5-dimethyltetrahydroquinoline | Do. |
| Do | (7) 1-pentaerythrityl-2,5-dimethylphenmorpholine | Do. |
| Do | (8) 1-β,γ,δ-trihydroxybutyl-2,7-dimethyltetrahydroquinoline | Do. |
| 2-amino-5-nitrophenylethylsulfone | 1-8 above | Bluish-rubine to bluish-violet. |
| 2-amino-5-nitro-β-methoxyethylsulfone | do | Do. |
| 2-amino-5-nitro-ω-methoxymethylsulfone | do | Do. |
| 2-amino-5-nitrophenyl-ω-carboxymethylsulfone | do | Do. |
| 2-amino-5-nitrophenyl-ω-carboxyethylsulfone | do | Do. |
| 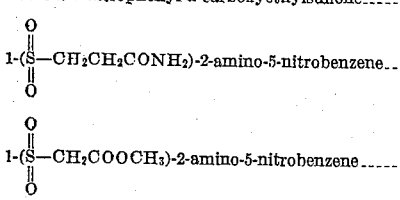 1-(S—CH₂CH₂CONH₂)-2-amino-5-nitrobenzene | do | Do. |
| 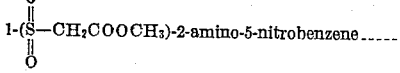 1-(S—CH₂COOCH₃)-2-amino-5-nitrobenzene | do | Do. | formed can be carried out in accordance with the procedure described in Example 1. The dye compound obtained colors cellulose acetate silk violet.

EXAMPLE 8

One gram mole of 2-amino-5-nitrophenyl-ω-methoxymethylsulfone is diazotized, and the diazonium compound obtained is coupled with one gram mole of 1-β,γ,δ-trihydroxybutyl-2-methyl-7-chlorotetrahydroquinoline. Diazotization, coupling, and recovery of the dye compound formed can be carried out in accordance with the procedure described in Example 1. The dye compound obtained colors cellulose acetate silk deep rubine shades.

EXAMPLE 9

One gram mole of 2-amino-5-nitrophenylpropylsulfone is diazotized, and the diazonium compound obtained is coupled with one gram mole of 1-methyl-2-methyltetrahydroquinoline. The dye compound obtained colors cellulose acetate silk and the other materials named heretofore reddish-violet.

One gram mole of diazotized 2-amino-5-nitrophenylbutylsulfone can be substituted for the diazonium compound of the example to obtain a dye compound which colors the materials above identified reddish-violet.

EXAMPLE 10

One gram mole of 2-amino-5-nitro-ω-carboxamidemethylsulfone is diazotized, and the diazonium compound obtained is coupled with one gram mole of 1-β-hydroxypropyl-2-methyl-5-chlorotetrahydroquinoline. The dye compound obtained yields shades on the textile materials named heretofore.

One gram mole of diazotized 2-amino-5-nitrophenyl-β-carboxamideethylsulfone can be substituted for the diazonium compound of the example to obtain a dye which yields colorations.

It will be understood that the examples given are intended to be illustrative and not limitative of our invention. Thus, any of the diazonium compounds disclosed herein can be coupled with any of the coupling components indicated herein to obtain dye compounds of our invention. Additional coupling components that can be employed to prepare compounds of our invention include:

1-β,γ-dihydroxypropyl - 2 - methyl - 8 - methoxytetrahydroquinoline
1-β,γ-dihydroxypropyl - 2 - ethyltetrahydroquinoline
1-β,γ-dihydroxypropyl - 2-β-hydroxyethyltetrahydroquinoline
1-β,γ-dihydroxypropyl - 2 - β - methoxyethyltetrahydroquinoline
1-γ-hydroxypropyl-2-methylphenmorpholine
1-β,γ-dihydroxypropyl-2-methyl - 7 - chlorphenmorpholine
1-β-methyl-β,γ-dihydroxypropyl - 2 - propylphenmorpholine
1-ethyl-2-methylphenmorpholine
1-propyl-2-methylphenmorpholine
1-β-sulfatoethyl-2-methyltetrahydroquinoline
1-β-sulfoethyl-2-methylphenmorpholine
1-Δ-hydroxybutyl-2-methyl-5-bromotetrahydroquinoline
1-β-hydroxyethyl-2-methyl-7-bromotetrahydroquinoline
1-β-hydroxyethyl-2-methyl - 7 - bromophenmorpholine
1-β,γ-dihydroxypropyl-2-methyl - 5 - bromophenmorpholine
1-β-sulfoethyl-2-methyltetrahydroquinoline and 1-β-sulfatoethyl-2-methylphenmorpholine The tetrahydroquinoline coupling compounds employed in the preparation of the azo compounds of our invention can be prepared by hydrogenating the corresponding quinoline compounds, unsubstituted in the ring nitrogen atom, and then introducing the alkyl substituent present on the ring nitrogen atom by methods known to the art for their introduction. The examples given hereinafter are illustrative of the hydrogenation and alkylation reactions employed.

HYDROGENATION

Preparation of 2-methyl tetrahydroquinoline

One gram mole of 2-methyl quinoline is reacted with hydrogen at a temperature of about 90° C. in the presence of 10 grams of a finely divided nickel catalyst such as Raney nickel under a hydrogen pressure of about 1500 pounds per square inch. Upon completion of the reaction, the 2-methyl tetrahydroquinoline formed is recovered, for example, by distillation under reduced pressure. Completion of the reaction can be determined, for example, by measuring the amount of hydrogen added to the pressure vessel to obtain the desired pressure and then, while maintaining the desired pressure, adding hydrogen until the amount required to produce the tetrahydroquinoline compound has been introduced. Again if excess hydrogen is originally added to the pressure vessel and no further hydrogen added the reaction is complete when the pressure remains substantially constant. As will be understood, the temperature and pressure conditions employed can be varied over wide limits. Those given, however, are suitable and can be used to successfully hydrogenate other quinoline compounds to obtain the corresponding tetrahydroquinoline compounds.

ALKYLATION

Preparation of 1-β,γ-dihydroxypropyl-2-methyl tetrahydroquinoline 1 gram mole of 2-methyl tetrahydroquinoline, 1.2 gram mole of sodium bicarbonate and 1.2 gram mole of glyceryl chlorohydrin are heated together in a reaction vessel with stirring at 140° C. for five hours. Following completion of the reaction, water is added to the reaction mixture which is then steam distilled to remove any unreacted 2-methyl tetrahydroquinoline. The desired compound is then recovered from the reaction mixture in known fashion and can be used without further purification.

Preparation of 1-β-hydroxyethyl-2,7-dimethyl tetrahydroquinoline 1 gram mole of 2,7-dimethyl tetrahydroquinoline is charged into an autoclave and heated at 180° C. with 1.1 gram mole of ethylene oxide for six hours. The reaction mixture is then permitted to cool following which the desired product is recovered by distilling the reaction mixture under reduced pressure.

The corresponding β-hydroxyl propyl compound can be similarly prepared by using propylene oxide in place of ethylene oxide.

Preparation of 1-sodium-β-sulfoethyl-7-chloro-tetrahydroquinoline 1 gram mole of 7-chlorotetrahydroquinoline, 1.1 gram mole of sodium-β-bromoethanesulfonate and 1.1 gram mole of sodium bicarbonate are heated together in a suitable reaction vessel to 120–150° C. for several hours. When no more carbon dioxide is evolved, the reaction mixture is poured into water, steam distilled to remove unreacted 7-chlorotetrahydroquinoline and the remaining solution concentrated to produce crystallization of the desired product.

The phenmorpholine coupling compounds employed in the preparation of the azo compounds of our invention can be prepared by alkylation of the corresponding phenmorpholine compounds which are unsubstituted in the ring nitrogen atom. Alkylation can be carried out in the same manner as described for the tetrahydroquinoline compounds and is illustrated by the following examples.

Preparation of 1-γ-hydroxypropyl-2-methyl phenmorpholine 1 gram mole of 2-methyl phenmorpholine is reacted with 1.1 gram mole of trimethylene chlorohydrin and 0.6 gram mole of sodium carbonate in a suitable reaction vessel at 140° C. for five hours. The desired product may be recovered from the reaction mixture by distillation under reduced pressure.

Preparation of 1-sodium-β-sulfatoethyl-2,7-dimethyl phenmorpholine 1 gram mole of 1-β-hydroxyethyl-2,7-dimethyl-phenmorpholine are dissolved in carbon tetrachloride and 1 gram mole of chlorosulfonic acid is added and the reaction conducted without heating; the reaction being completed by warming slightly. Sodium carbonate is then added to the reaction mixture until it is neutral to Congo red paper. The carbon tetrachloride may be largely removed by distillation following which the desired product can be obtained by crystallization on evaporation of the remaining carbon tetrachloride.

Additional information regarding the preparation of phenmorpholine compounds is to be found in McNally and Dickey U. S. Patent No. 2,196,222, issued April 9, 1940. Similarly, additional information concerning the preparation of tetrahydroquinoline compounds will be found in Dickey and McNally application Serial No. 306,201, filed November 25, 1939.

The azo compounds of our invention are, for the most part, relatively insoluble in water and, accordingly, they can be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dye is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in McNally and Dickey Patent No. 2,115,030, issued April 26, 1938. The process disclosed in this patent for the dyeing of cellulose acetate silk can be used in applying the dyes of the present application to this material.

It will be understood that the other textile materials named hereinbefore can be directly colored from an aqueous dyebath in a similar manner as cellulose acetate silk. However, other suitable methods for the dyeing of these materials are known to those skilled in the art and these methods, of course, can be used in applying the dye compounds of this application if desired. We would further note that, while colors yielded by the dye compounds have been given primarily with reference to cellulose acetate silk, generally similar colors are ordinarily obtained on the other materials.

We claim:

1. The azo compounds having the formula:

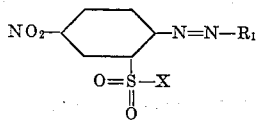

wherein X stands for a member selected from the group consisting of an alkyl group, an alkylcarboxyl group, and an alkylcarboxamide group, and R₁ stands for a member selected from the group consisting of a 1-alkyl-2-low carbon alkyl tetrahydroquinoline nucleus and a 1-alkyl-2-low carbon alkyl phenmorpholine nucleus, said tetrahydroquinoline and phenmorpholine nuclei being joined to the azo bond shown through the carbon atom in the 6-position.

2. The azo compounds having the formula:

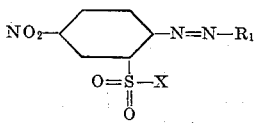

wherein X stands for a member selected from the group consisting of an alkyl group, an alkylcarboxyl group, and an alkylcarboxamide group, and R₁ stands for a 1-hydroxyalkyl-2-low carbon alkyl tetrahydroquinoline nucleus which is joined to the azo bond shown through the carbon atom in its 6-position.

3. The azo compounds having the formula:

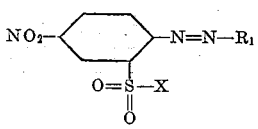

wherein X stands for a member selected from the group consisting of a alkyl group, an alkylcarboxyl group, and an alkylcarboxamide group, and R₁ stands for a 1-hydroxyalkyl-2-low carbon alkyl phenmorpholine nucleus which is joined to the azo bond shown through the carbon atom in its 6-position.

4. The azo compounds having the formula:

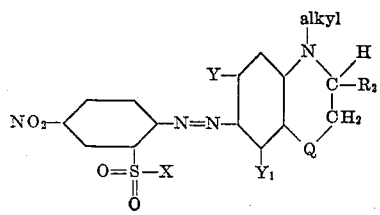

wherein Q stands for a member selected from the group consisting of O and CH₂, R₂ stands for a low carbon alkyl group, X stands for a member selected from the group consisting of an alkyl group, an alkylcarboxyl group, and an alkylcarboxamide group, and Y and Y₁ each stands for a member selected from the group consisting of hydrogen, a low carbon alkyl hydrocarbon group and a halogen atom.

5. The azo compounds having the formula:

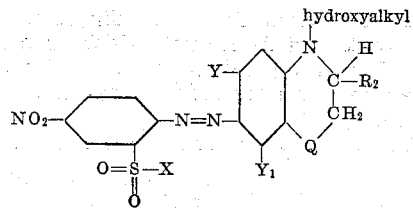

wherein Q stands for a member selected from the group consisting of O and CH₂, R₂ stands for a low carbon alkyl group, X stands for a member selected from the group consisting of an alkyl group, an alkylcarboxyl group, and an alkylcarboxamide group, and Y and Y₁ each stands for a member selected from the group consisting of hydrogen, a low carbon alkyl hydrocarbon group, and a halogen atom.

6. The azo compounds having the formula:

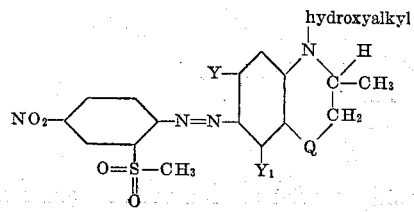

wherein Q stands for a member selected from the group consisting of O and CH₂ and Y and Y₁ each stands for a member selected from the group consisting of hydrogen, a low carbon alkyl hydrocarbon group, and a halogen atom.

7. The azo compounds having the formula:

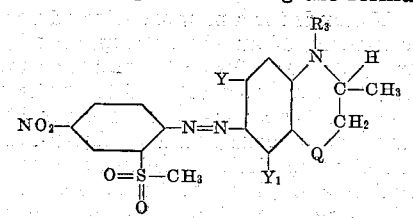

wherein R₃ stands for a β,γ-dihydroxypropyl group, Q stands for a member selected from the group consisting of O and CH₂ and Y and Y₁ each stands for a member selected from the group consisting of hydrogen, a low carbon alkyl hydrocarbon group, and a halogen atom.

8. The azo compounds having the formula:

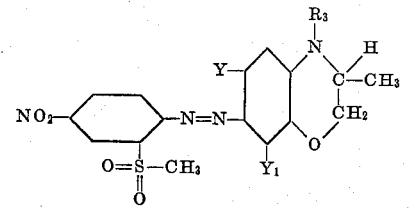

wherein R₃ stands for a β,γ-dihydroxypropyl group and Y and Y₁ each stands for a member selected from the group consisting of hydrogen, a low carbon alkyl hydrocarbon group and a halogen atom.

9. The azo compounds having the formula:

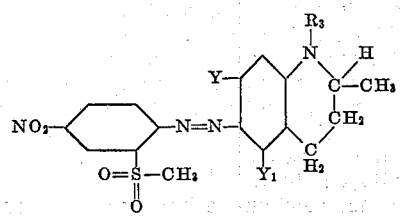

wherein $R_3$ stands for a $\beta,\gamma$-dihydroxypropyl group and Y and $Y_1$ each stands for a member selected from the group consisting of hydrogen, a low carbon alkyl hydrocarbon group, and a halogen atom.

10. The azo compound having the formula:

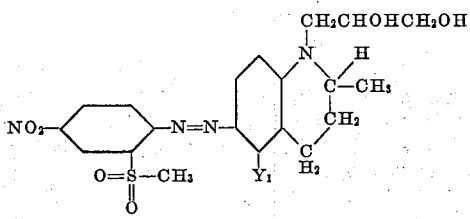

11. The azo compound having the formula:

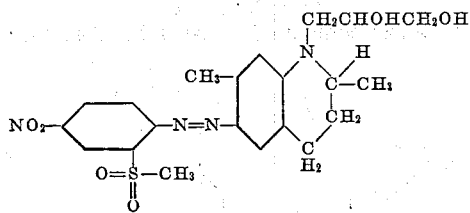

12. Textile material colored with an azo compound having the formula:

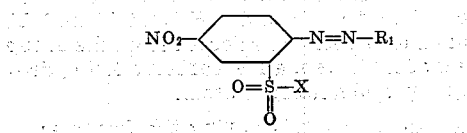

wherein X stands for a member selected from the group consisting of an alkyl group, an alkylcarboxyl group, and an alkylcarboxamide group, and $R_1$ stands for a member selected from the group consisting of a 1-alkyl-2-low carbon alkyl tetrahydroquinoline nucleus and a 1-alkyl-2-low carbon alkyl phenmorpholine nucleus, said tetrahydroquinoline and phenmorpholine nuclei being joined to the azo bond shown through the carbon atom in the 6-position.

13. Textile material colored with an azo dye compound having the formula:

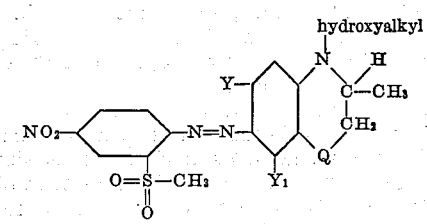

wherein Q stands for a member selected from the group consisting of O and $CH_2$ and Y and $Y_1$ each stands for a member selected from the group consisting of hydrogen, a low carbon alkyl hydrocarbon group, and a halogen atom.

14. A cellulose acetate colored with a nuclear non-sulfonated azo dye compound having the formula:

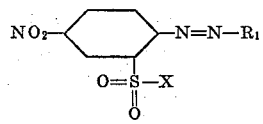

wherein X stands for a member selected from the group consisting of an alkyl group, an alkylcarboxyl group, and an alkylcarboxamide group, and $R_1$ stands for a member selected from the group consisting of a 1-alkyl-2-low carbon alkyl tetrahydroquinoline nucleus and a 1-alkyl-2-low carbon alkyl phenmorpholine nucleus, said tetrahydroquinoline and phenmorpholine nuclei being joined to the azo bond shown through the carbon atom in the 6-position.

15. A cellulose acetate colored with a nuclear non-sulfonated azo dye compound having the formula:

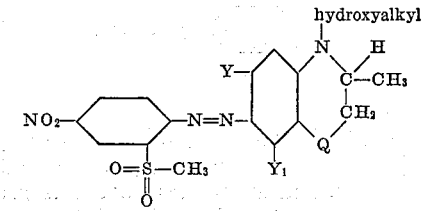

wherein Q stands for a member selected from the group consisting of O and $CH_2$ and Y and $Y_1$ each stands for a member selected from the group consisting of hydrogen, a low carbon alkyl hydrocarbon group, and a halogen atom.

JOSEPH B. DICKEY.
JAMES G. McNALLY.